United States Patent
Cerciello

(10) Patent No.: US 9,597,705 B2
(45) Date of Patent: Mar. 21, 2017

(54) ADHESIVE SPREADING UNIT PROVIDED WITH A ROLLER-CLEANING DEVICE

(71) Applicant: NORDMECCANICA S.P.A., Piacenza (IT)

(72) Inventor: Antonio Cerciello, Piacenza (IT)

(73) Assignee: NORDMECCANICA S.P.A., Piacenza (IT)

( * ) Notice: Subject to any disclaimer, the term of this patent is extended or adjusted under 35 U.S.C. 154(b) by 164 days.

(21) Appl. No.: 14/372,379

(22) PCT Filed: Jan. 17, 2013

(86) PCT No.: PCT/IB2013/050427
§ 371 (c)(1),
(2) Date: Jul. 15, 2014

(87) PCT Pub. No.: WO2013/108205
PCT Pub. Date: Jul. 25, 2013

(65) Prior Publication Data
US 2014/0352610 A1    Dec. 4, 2014

(30) Foreign Application Priority Data

Jan. 19, 2012   (IT) .............................. PC2012A0001

(51) Int. Cl.
*B05C 11/00*    (2006.01)
*B08B 3/02*    (2006.01)
(Continued)

(52) U.S. Cl.
CPC ............ *B05C 11/00* (2013.01); *B05C 1/0826* (2013.01); *B08B 3/024* (2013.01);
(Continued)

(58) Field of Classification Search
CPC ........ B41F 35/006; B41F 35/02; B41F 35/04; B41F 35/06; B41P 2235/26; B41J 29/17
(Continued)

(56) References Cited

U.S. PATENT DOCUMENTS 6,309,472 B1   10/2001   Schonenberg et al.
2008/0029129 A1   2/2008   Mann
(Continued)

FOREIGN PATENT DOCUMENTS

CH       698 563 A2    8/2009
DE    29 20 328 A1   11/1980
(Continued)

OTHER PUBLICATIONS

International Search Report, dated May 3, 2013, from corresponding PCT application.

*Primary Examiner* — Laura Edwards
(74) *Attorney, Agent, or Firm* — Young & Thompson

(57) ABSTRACT

An adhesive-spreading assembly includes a plurality of rollers (R), that rotate in contact with one another to transfer a thin layer of adhesive from a tank (T) onto a film in motion, complete with a device for cleaning the rollers (R), removably connectable to the adhesive-spreading assembly and including at least one tank (5, 6) containing at least one cleaning fluid and pumping elements (8) for transferring the fluid to distributor elements (12) for delivering a part of the fluid onto the surface of the rollers (R). The adhesive-spreading assembly includes a transfer system (15) designed to transfer the distributor elements (12) in a direction substantially parallel to the axis of the rollers to distribute the fluid over their whole surface, the transfer system being configured so that it can be removably coupled with the distributor elements.

10 Claims, 3 Drawing Sheets

(51) Int. Cl.
    *B32B 38/16* (2006.01)
    *B32B 37/12* (2006.01)
    *B05C 1/08* (2006.01)
(52) U.S. Cl.
    CPC ........ *B32B 37/1284* (2013.01); *B32B 38/162* (2013.01); *B05C 1/0813* (2013.01); *B05C 1/0834* (2013.01)
(58) Field of Classification Search
    USPC .......... 118/203, 302; 134/198; 101/423, 425
    See application file for complete search history.

(56) References Cited

U.S. PATENT DOCUMENTS

| | | |
|---|---|---|
| 2010/0062697 A1 | 3/2010 | Vedsted et al. |
| 2011/0168215 A1 | 7/2011 | Anglade |

FOREIGN PATENT DOCUMENTS

| | | |
|---|---|---|
| EP | 0 995 504 A2 | 4/2000 |
| EP | 2 085 219 A2 | 8/2009 |
| EP | 2 213 383 A1 | 8/2010 |
| JP | 5 042309 A | 2/1993 |
| WO | 99/59740 A1 | 11/1999 |
| WO | 2009/156598 A1 | 12/2009 |

ADHESIVE SPREADING UNIT PROVIDED WITH A ROLLER-CLEANING DEVICE

The present invention relates to an assembly for spreading an adhesive and, more in particular, to an adhesive-spreading assembly of the type used in coupling machines or the like, complete with a device for cleaning the adhesive-spreading rollers.

It is common knowledge that the machines used for coupling several films (possibly made of different materials) together include means for spreading an adhesive comprising a plurality of rollers that rotate in contact with one another so as to transfer a thin layer of adhesive onto a film in motion.

An adhesive-spreading assembly of this type is described in the European patent application EP 2.085.219 lodged by the same applicant.

In detail, said known adhesive-spreading assembly comprises at least a first roller designed to collect adhesive from a tank and transfer it to a second roller that moves at a faster speed so that the layer of adhesive collected on the latter is thinner; the second roller is likewise designed to transfer the adhesive to a third roller turning at an even faster speed, that is slidingly in contact with the film to be coupled and thus deposits the adhesive thereon.

Every time the machine is stopped for a period of time, e.g. when production is temporarily interrupted, or to allow for servicing procedures, the adhesive-spreading rollers must be cleaned to avoid the adhesive drying on their surface and making it impossible to use them when the machine is started again.

In particular, to ensure the utmost adhesive-spreading efficiency and precision, all traces of adhesive must be removed from the rollers to avoid it drying and altering the rollers' original surface roughness, and the subsequent spreading process as a consequence.

These cleaning procedures are currently performed manually by one or more operators who have to access the inside of the coupling machine through safety hatches in order to reach the rollers.

In detail, the cleaning procedure involves pouring specific cleaning fluids onto the rollers and rubbing their surfaces with cloths or the like.

To make this procedure easier for the operator, the rollers are turned slowly by means of a manual control so that their whole surface can be reached from the same position.

The above-described cleaning procedure has numerous drawbacks, however.

First of all, it is the not very efficient because, being done entirely by hand, it demands the use of manpower for several dozen minutes.

In fact, given the above-described unfavourable working conditions, the operator takes a considerable amount of time to complete the cleaning procedure reasonably effectively.

Using this method, the safety issues for the operator completing the cleaning procedure are also far from negligible.

As already mentioned, the operator is obliged to go inside the machine, disabling all of the safety devices in order to do so, and to work in the vicinity of mechanical parts in motion, with the related risks that this entails (i.e. the risk of the operators' clothing becoming entangled, or even of their hands being crushed between two counter-rotating rollers).

In addition to the above, the operator is obliged to work in close contact with cleaning fluids that consist of chemical products containing solvents, which are harmful if inhaled and irritant in contact with the skin.

In the light of the above, the object of the present invention is an adhesive-spreading assembly that overcomes the drawbacks of the known state of the art.

In detail, the object of the invention is an adhesive-spreading assembly with a roller-cleaning device that enables the above-described roller-cleaning procedure to be completed entirely automatically.

To be more precise, the object of the invention is an adhesive-spreading assembly with a roller-cleaning device that does not require the use of manpower and that ensures a higher level of operator safety.

A further object of the present invention is an adhesive-spreading assembly with a roller-cleaning device that not only takes less time to complete the cleaning procedure, but also ensures an optimal cleaning of the rollers.

Another object of the present invention is an adhesive-spreading assembly with a roller-cleaning device that is simple to manufacture, inexpensive and requires no modification of the known coupling machines with which it is associated.

Another object of the present invention is an adhesive-spreading assembly with a roller-cleaning device that can be quickly and easily attached to and removed from the adhesive-spreading assembly to reduce the machine outage times to a minimum.

The above-mentioned objects are substantially achieved by an adhesive-spreading assembly with a roller-cleaning device according to one or more of the attached claims.

In particular, the objects are achieved by an adhesive-spreading assembly comprising a plurality of rollers that rotate in contact with one another to transfer a thin layer of adhesive from a tank onto a film in motion, and complete with a device for cleaning said rollers for removably attaching to said adhesive-spreading assembly, comprising at least one tank for at least one cleaning fluid, pumping means for delivering said fluid to distributor means designed to apply a part of said fluid to the surface of the rollers, characterised in that said adhesive-spreading assembly comprises a transfer system designed to move said distributor means in a direction substantially parallel to the axis of the rollers to distribute said cleaning fluid over their whole surface, said transfer system being designed to be removably coupled to said distributor means.

Using the device configured as above, the cleaning device can be attached to the adhesive-spreading assembly as and when it is necessary to clean the rollers, and particularly to remove all residual traces of adhesive quickly and completely automatically, thanks to the transfer system.

Said system for transferring the distributor means also ensures an even distribution of the cleaning fluid over the whole surface of the rollers, guaranteeing the utmost efficacy of the cleaning procedure.

According to the invention, said transfer system may comprise a bearing element mounted slidingly on a guide and driven by means of one or more actuators along an axis substantially parallel to the axis of the rollers in the adhesive-spreading assembly.

According to a preferred embodiment, said bearing consists of a body shaped to be removably coupled with a distributor head. This enables the cleaning device to be attached only during cleaning procedures and to be removed during the normal operation of the machine, thus reducing the machine's footprint.

More in detail, the body of the bearing may include a seat designed to contain a pin attached to the distributor head and projecting therefrom, for connecting to the seat with the aid of suitable locking means.

The bearing body thus configured enables the transfer device to be used to attach both the cleaning fluid distributor head and the adhesive dispenser head during the normal operation of the machine, thereby enabling the structural complexity of the machine to be reduced.

Other characteristics and advantages will emerge more clearly from the general, and therefore non-limiting description below of a preferred, but not exclusive embodiment of the invention, as illustrated in the attached figures, wherein.

Figure 1:
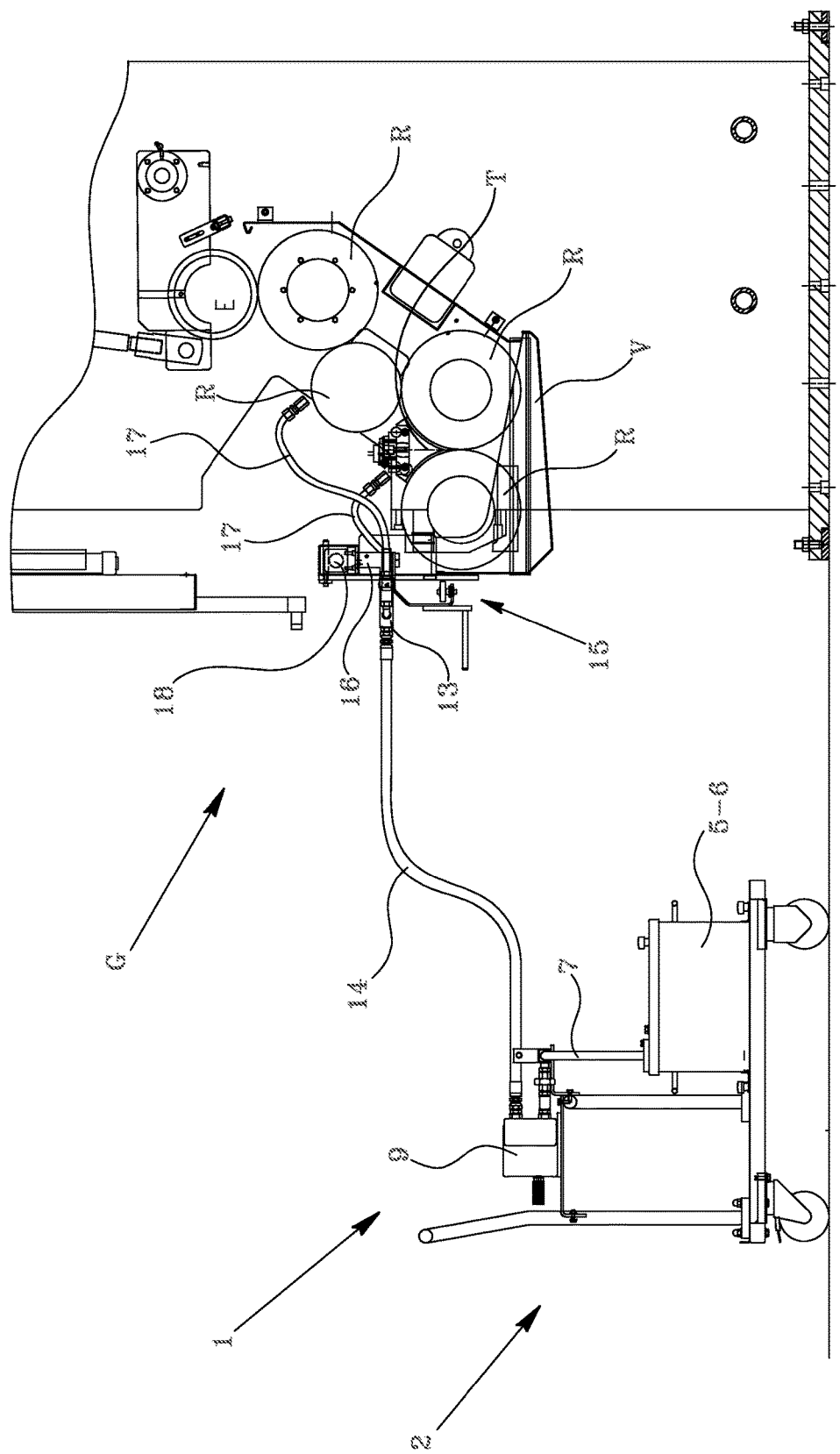
FIG. 1 is a side view of an adhesive-spreading assembly with a roller-cleaning device according to the present invention.
Figure 2:
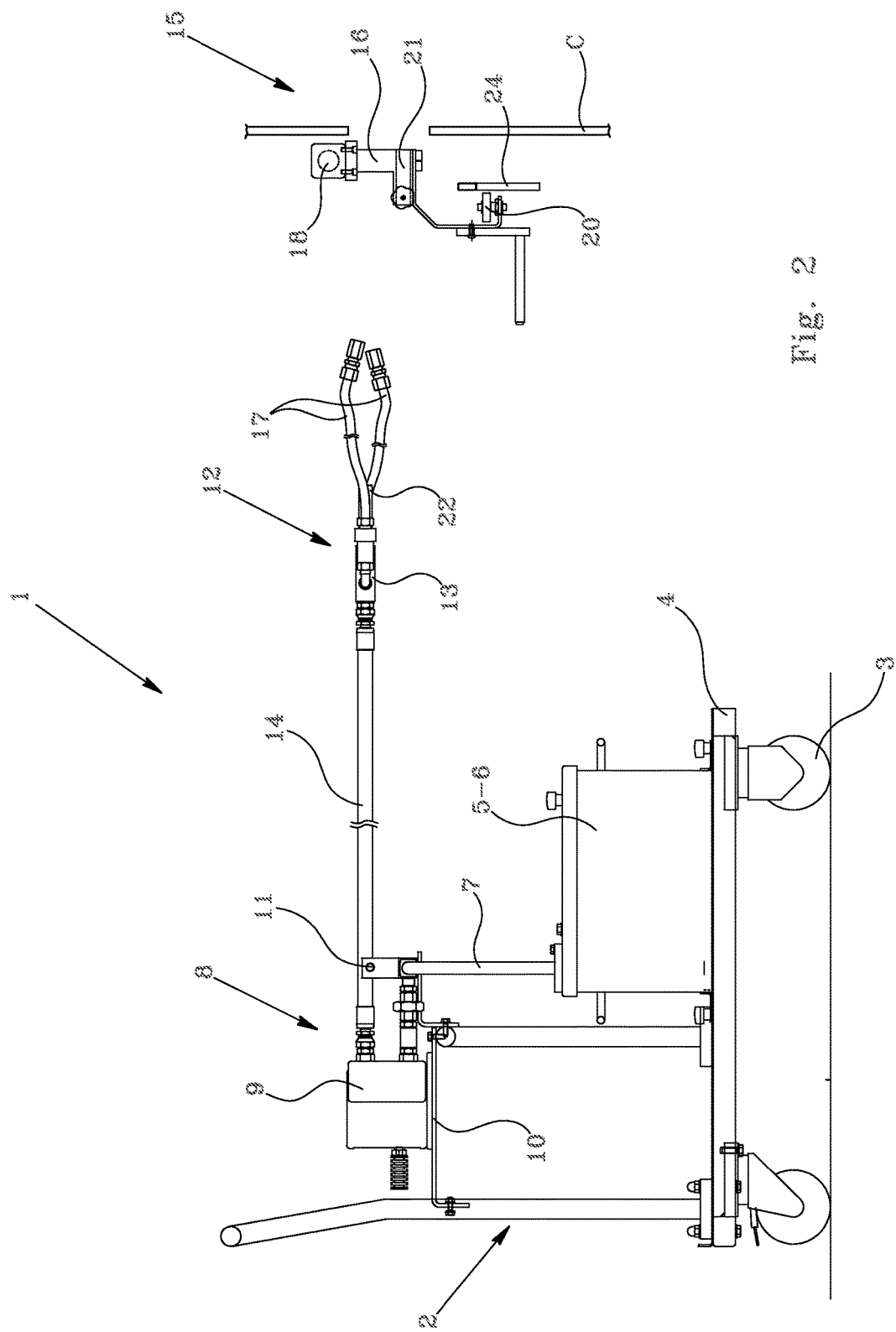
FIG. 2 is a side view of the roller-cleaning device according to the invention.
Figure 3:
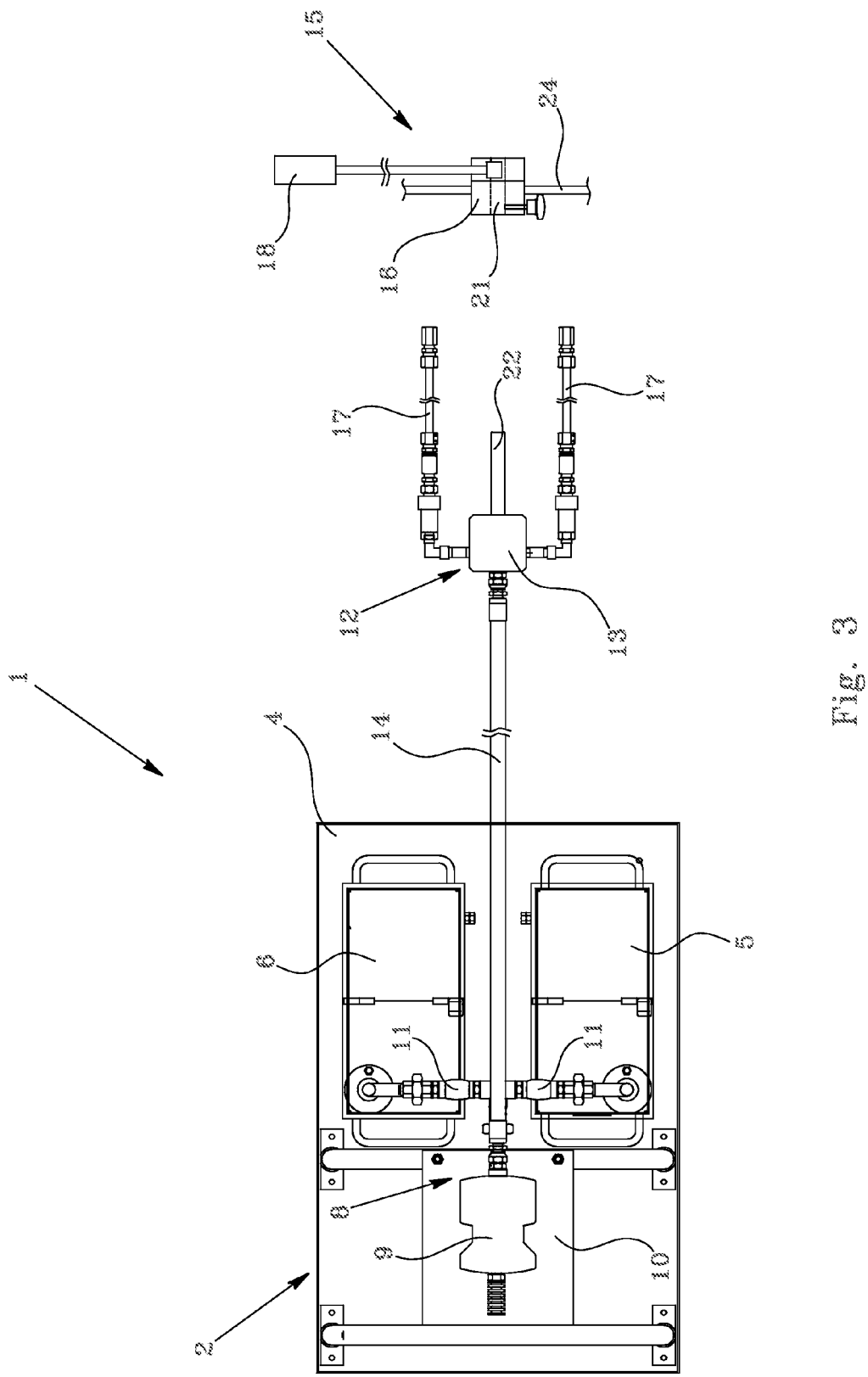
FIG. 3 is a view from above of the roller-cleaning device in FIG. 2.

With reference to the attached figures, the adhesive-spreading assembly, indicated globally by the letter G, comprises a plurality of rollers R that rotate in contact with one another to transfer a thin layer of adhesive from a tank T onto a film F in motion, e.g. in a coupling machine or the like.

According to the invention, the adhesive-spreading assembly is complete with a cleaning device 1, comprising a supporting structure 2, preferably with rolling means to facilitate its displacement when it has to be juxtaposed with the adhesive-spreading assembly to complete the cleaning procedure.

In the embodiment illustrated, said structure 2 comprises a wheel-mounted trolley 3, with a platform 4 on which the various components are installed.

According to the invention, the device comprises at least one tank, located on said platform, for containing a cleaning fluid, e.g. solvents or the like, suitable for removing adhesive from the surface of the rollers R in the adhesive-spreading assembly G.

The cleaning device preferably includes a pair of tanks 5 and 6, containing a reagent fluid and a solvent fluid, respectively.

Said tanks are connected by piping 7 to pumping means, indicated globally by the numeral 8, for delivering said fluid to the surface of the rollers R.

The pumping means 8 can be connected to control means serving a coupling machine.

In a preferred embodiment, said pumping means comprise a pneumatically-controlled diaphragm pump 9. Better still, said pump is a double-diaphragm pump because a pump of this type guarantees high safety standards in the presence of flammable liquids such as solvents or the like.

To ensure proper operation, said pump is positioned on a level higher than the surface of the fluid(s) in the tanks 5 and 6. For this purpose, the trolley comprises a supporting element with a raised shelf 10 on which the pump is anchored.

To enable the delivery of only one fluid at a time (only the reagent or only the solvent), there is an on/off valve 11 on each pipe 7 connected to the tanks 5 and 6. Thus, when the pump is operating, its suction line is only connected to one of the two tanks.

The operation of the valves 11, and of the valve that enables the pump 9, is preferably controlled by a suitable cleaning program input in the PLC used to manage the coupling machine on which the adhesive-spreading assembly is installed.

Alternatively, the device may be fitted with its own control unit (not shown in the figure), connected to said valves and possibly to the PLC serving the coupling machine in order to communicate therewith.

The pump 9 is connected on the delivery side with distributor means, indicated globally by the numeral 12, designed to distribute the cleaning fluids on the surface of the rollers in the adhesive-spreading assembly.

More in detail, said distributor means comprise a distributor head 13 connected to the pump 9 by means of piping 14.

On said distributor head, there are also one or more outlet pipe(s) 17, complete with a nozzle for positioning in the vicinity of the surface of the various rollers.

Said piping 17 is preferably rigid piping, suitable for retaining a pre-set shape or a given curvature.

A characteristic of the invention lies in that it includes a transfer system, indicated globally by the numeral 15, designed to transfer said distributor head 13 in a direction substantially parallel to the axis of the rollers.

Said distributor head 13 can thus be moved alternately from one end of the rollers to the other to enable an even distribution of the cleaning fluids over their whole surface.

More in detail, said transfer system 15 may comprise a bearing 16 slidingly installed on a guide 24 and driven by means of one or more actuators 18, such as pneumatic actuators or the like.

According to the embodiment illustrated, the bearing 16 comprises a body shaped so that it can be removably coupled with the distributor head 13.

In detail, said body includes a seat 21, designed to contain a pin 22 extending from the distributor head 13, blocking means such as a screw or the like being provided to connect said two elements firmly together.

The body of the bearing 16 preferably comprises rolling means 20 for sliding along the guide 24.

According to the invention, the transfer system 15 can be juxtaposed with the outer casing C of the adhesive-spreading assembly on a coupling machine so that only the outlet pipes 17 on the distributor head are inside the machine, up against the rollers.

Said transfer system may be attached to the machine in a fixed or movable manner, according to need.

FIG. 1 shows the adhesive-spreading assembly complete with the roller-cleaning device according to the invention in the working configuration.

In an adhesive-spreading assembly of this type, the tank T of adhesive occupies the volume coming between the surfaces of the first two rollers, which are counter-rotating.

Generally speaking, the adhesive is dispensed continuously in this area by means of a dispensing head connected to a suitable adhesive supply system, generally located outside the machine.

To facilitate an even distribution of the adhesive over the full length of the rollers, it is necessary here again to use a transfer system designed to move the dispensing head (not shown in the figure) from one end of the rollers to the other.

In this case, said transfer system 15 according to the invention can be used both to transfer the distributor head 13 during the roller-cleaning procedure, when the machine is not in use, and to transfer the adhesive-dispensing head.

More in detail, the seat 21 in the body of the bearing 16 may contain either the pin 22 on the distributor head 13 or a particular part on the adhesive-dispensing head, e.g. a pipe or the like.

This enables the roller-cleaning device to be attached to adhesive-spreading assemblies already fitted with a transfer system, without needing to make any changes and with a further saving of manufacturing costs.

The procedure for cleaning the rollers R in the adhesive-spreading assembly using the device according to the invention is extremely quick and simple.

In fact, it is only necessary to juxtapose the device with the machine and place the pipes 17 with the nozzles up against the surfaces of the various rollers.

Then a cleaning program memorised in the PLC serving the coupling machine can be used to operate the pump 9 and the corresponding valves 11 to dispense the cleaning fluid on the surfaces of the rollers.

In detail, it is preferable to dispense the reagent fluid first, and then the solvent fluid after an interval established by the program.

During the cleaning procedure, the rollers are preferably turned so as to coat their whole surface with the cleaning fluids.

To limit the number of pipes 17 needed, the rollers are turned in contact with one another so that one pipe suffices to ensure an adequate distribution of the fluid on the surfaces of at least two adjacent rollers.

Then the rollers are separated and turned again to enable all adhesive residues and cleaning fluid to pour into a suitable collection tank V underneath (already used as part of the adhesive-spreading assembly).

The rotation and displacement of the rollers are also controlled automatically by the program saved in the PLC serving the machine.

It is clear from the above description that the adhesive-spreading assembly with a roller-cleaning device according to the invention enables the rollers to be cleaned completely automatically, quickly, and without the need for any manpower.

In particular, this cleaning procedure only requires an operator to take action on the device by means of the PLC on the machine, consequently eliminating all the safety issues involved in the known cleaning method.

In addition, the adhesive-spreading assembly does not need to undergo any costly modification, by comparison with the known adhesive-spreading assemblies, in order to attach the cleaning device.

The present invention, as described and illustrated above, is liable to numerous modifications and variants, all coming within the scope of the inventive concept; in addition, all the component parts may be replaced by other technically-equivalent elements.

The invention claimed is:

1. An adhesive-spreading assembly comprising an outer casing (C) positionable on a coupling machine, a plurality of adhesive rollers (R), that turn in contact with one another to transfer a thin layer of adhesive from a tank (T) onto a film in motion, complete with a device for cleaning said adhesive rollers (R), removably connectable to said adhesive-spreading assembly, wherein said device comprises a supporting structure (2) with rolling means, at least one tank (5, 6) containing at least one cleaning fluid and pumping means (8) for transferring said fluid to distributor means (12) for delivering a part of said fluid onto the surface of the adhesive rollers (R), said adhesive-spreading assembly further comprising a transfer system (15) designed to transfer said distributor means (12) in a direction substantially parallel to the axis of the adhesive rollers to distribute said fluid over their whole surface, said transfer system being configured so as to be removably coupled with said distributor means, wherein said distributor means (12) comprise a distributor head (13) connected at its inlet to the pumping means (8), said distributor head being connected to one or more delivery pipes (17) fitted with nozzles for positioning in the vicinity of the surfaces of the rollers, and wherein the transfer system (15) can be juxtaposed with the outer casing (C) of the adhesive-spreading assembly when the adhesive-spreading assembly is on the coupling machine so that only the outlet pipes (17) are inside the coupling machine, up against the adhesive rollers (R).

2. An adhesive-spreading assembly according to claim 1, wherein said transfer system (15) comprises a bearing element (16) slidingly installed on a guide (24) and driven by one or more actuators (18) along an axis substantially parallel to the axis of the rollers (R).

3. An adhesive-spreading assembly according to claim 2, wherein said bearing (16) comprises a body shaped so that it can be removably coupled with said distributor head (13).

4. An adhesive-spreading assembly according to claim 3, wherein said body includes a seat (21) for containing a pin (22) extending from the distributor head (13), blocking means being provided to connect said body and said distributor head (13) firmly together.

5. An adhesive-spreading assembly according to claim 2, wherein said bearing (16) and said distributor head (13) are joined together and can be connected to the actuator (18).

6. An adhesive-spreading assembly according to claim 1, wherein said pipes (17) are modular rigid pipes.

7. An adhesive-spreading assembly according to claim 1, wherein the adhesive-spreading assembly includes a pair of tanks (5, 6) respectively containing a reagent fluid and a solvent fluid.

8. An adhesive-spreading assembly according to claim 7, wherein said tanks (5, 6) are connected to pumping means (8) by pipes (7) each fitted with an on/off valve (11) located upstream from the pumping means.

9. An adhesive-spreading assembly according to claim 8, wherein said pumping means (8) comprise a diaphragm pump (9).

10. An adhesive-spreading assembly according to claim 8, wherein said pumping means (8) can be connected to control means serving a coupling machine.

* * * * *